United States Patent Office 2,867,673
Patented Jan. 6, 1959

2,867,673

SIDE-CHAIN ALKYLATION IN THE PRESENCE OF A LEAD TETRAALKYL CATALYST

Joseph A. Chenicek, Bensenville, and Herman S. Bloch, Chicago, Ill., assignors to Universal Oil Products Company, Des Plaines, Ill., a corporation of Delaware No Drawing. Application May 14, 1954
Serial No. 429,978

13 Claims. (Cl. 260—668)

This application is a continuation-in-part of our copending application, Serial No. 219,311, filed April 4, 1951, now abandoned.

This invention relates to the condensation of unsaturated organic compounds with aromatic compounds and to products formed thereby. This invention relates more particularly to the side chain alkylation with an olefin of an alkylaromatic hydrocarbon in which a carbon atom combined with the aromatic nucleus is also combined with at least one hydrogen atom. The process relates still more specifically to the side chain alkylation with ethylene of an alkylbenzene hydrocarbon having at least one hydrogen atom combined with a carbon atom in alpha position to the benzene ring.

The condensation of aromatic compounds with unsaturated organic compound such as the alkylation of aromatic hydrocarbons with olefinic hydrocarbons, has been the subject of many investigations over a long period of time. Many different catalysts have been used including various mineral acids and acid-acting compounds but in all of these reactions, nuclear condensation has always been effected. Thus in the acid catalyzed alkylation of aromatic compounds having attached to a carbon atom of the ring a saturated carbon atom to which is attached at least one hydrogen atom, the entering alkyl group attaches to the aromatic nucleus.

We have now found that toluene and other carbocyclic aromatic and heterocyclic aromatic ring compounds having a nonolefinic double bond such as pyridine, quinoline, pyrrole, etc. and having attached to a nuclear carbon atom a saturated carbon atom to which is attached at least one hydrogen atom may also be used as starting materials to effect side chain alkylation with an unsaturated compound at reasonably low temperatures and pressures in the presence of a catalyst comprising essentially a free radical generating material. The free radical generating materials we have in mind comprise lead tetraalkyls which decompose and form free radicals at an elevated temperature, and they also include certain azo and diazo compounds. The carbon atom which is attached to the aromatic nucleus of said aromatic compounds is referred to as a "saturated" carbon atom because it is a part of a non-olefinic group such as an alkyl group, a cycloalkyl group, a cycloalkalkyl group, or an aralkyl group containing no ethylenic bonds or similar unsaturation.

An object of this invention is to react an unsaturated organic compound with an aromatic compound selected from the group consisting of carbocyclic and heterocyclic aromatic ring compounds having attached to a nuclear carbon atom a non-olefinic or saturated carbon atom to which is attached at least one hydrogen atom.

An additional object of this invention is to react a monoolefin with an alkylaromatic hydrocarbon to form an aromatic hydrocarbon with a longer alkyl group.

Another object of this invention is to condense ethylene with the side chain of an alkylaromatic hydrocarbon having attached to a nuclear carbon atom a carbon atom of said alkyl group to which is attached at least one hydrogen atom.

Still another object of this invention is to condense ethylene with the alkyl side chain of an alkylbenzene hydrocarbon, said side chain containing an alpha carbon atom to which is attached a replaceable hydrogen atom.

A further object of this invention is to condense ethylene with the cycloalkyl group of a cycloalkylbenzene hydrocarbon, said cycloalkyl group having a hydrogen atom combined with the carbon atom of the cycloalkyl group which is attached to the aromatic ring.

A still further object of this invention is to provide a process for the side chain alkylation of an alkylaromatic hydrocarbon.

A further object of this invention is to condense ethylene with a polycyclic aromatic hydrocarbon having at least one of the rings saturated and having at least one hydrogen atom combined with the carbon atom of the saturated ring which is attached to the aromatic ring.

An additional object of this invention is to provide a method for producing an aromatic compound containing a long hydrocarbon side chain, said compound being useful in the production of detergents, wetting agents and the like.

One embodiment of this invention relates to a process which comprises reacting an unsaturated organic compound and an aromatic compound selected from the group consisting of carbocyclic aromatic and heterocyclic aromatic ring compounds having attached to a nuclear carbon atom a carbon atom of a hydrocarbon group selected from the group consisting of an alkyl group, a cycloalkyl group, a cycloalkalkyl group, and an aralkyl group and to which last named carbon atom is attached at least one hydrogen atom, the process being carried out at condensation conditions in the presence of a catalyst consisting of a lead tetraalkyl which decomposes and forms free radicals at an elevated temperature, and recovering the resultant condensation product.

A second embodiment of this invention relates to a process which comprises reacting an olefinic hydrocarbon and an aromatic compound selected from the group consisting of carbocyclic aromatic and heterocyclic aromatic ring compounds having attached to a nuclear carbon atom a carbon atom of a saturated hydrocarbon group and to which last named carbon atom is attached at least one hydrogen atom at condensation conditions in the presence of a catalyst consisting of a lead tetraalkyl which decomposes and forms free radicals at an elevated temperature and recovering the resultant condensation product.

Another embodiment of this invention relates to a process which comprises reacting a monoolefin and an aromatic compound having attached to a nuclear carbon atom a carbon atom of a saturated hydrocarbon group and to which last named carbon atom is attached at least one hydrogen atom at condensation conditions in the presence of a catalyst consisting of a lead tetraalkyl which decomposes and forms free radicals at an elevated temperature, and recovering the resultant condensation product.

Still another embodiment of this invention relates to a process for producing longer chain aromatic hydrocarbons which comprises reacting an alkene and an aromatic hydrocarbon having attached to a nuclear carbon atom a carbon atom of a saturated hydrocarbon group and to which last named carbon atom is attached at least one hydrogen atom at a condensation temperature in the presence of a catalyst comprising essentially a lead tetraalkyl which decomposes and forms free radicals at an elevated temperature and recovering the resultant condensation product.

A further embodiment of this invention relates to a process for producing a longer chain benzene hydrocarbon which comprises reacting an alkene and a benzene hydrocarbon having attached to a nuclear carbon atom a carbon atom of a saturated hydrocarbon group and to which last named carbon atom is attached at least one hydrogen atom at a condensation temperature in the presence of a catalyst comprising essentially a lead tetraalkyl which decomposes and forms free radicals at an elevated temperature and recovering the resultant condensation product.

A still further embodiment of this invention relates to a process for producing a longer chain benzene hydrocarbon which comprises reacting ethylene and a benzene hydrocarbon having attached to a nuclear carbon atom a carbon atom of a saturated hydrocarbon group and to which last named carbon atom is attached at least one hydrogen atom at a condensation temperature in the presence of a catalyst comprising essentially a lead tetraalkyl which decomposes and forms free radicals at an elevated temperature and recovering a longer chain benzene hydrocarbon from the resultant reaction product.

An additional embodiment of this invention relates to a process for producing a longer chain benzene hydrocarbon which comprises reacting ethylene and a benzene hydrocarbon having attached to a nuclear carbon atom a carbon atom of a saturated hydrocarbon group and to which last named carbon atom is attached at least one hydrogen atom at a condensation temperature in the presence of a catalyst comprising essentially lead tetraethyl, and recovering a longer chain benzene hydrocarbon from the resultant reaction product.

A still additional embodiment of this invention relates to a process which comprises catalytically reacting an olefinic hydrocarbon and an aromatic compound having a structure represented by the formula:

wherein Ar represents an aromatic radical having a nucleus selected from carbocyclic and heterocyclic nuclei and R and R' each separately and independently represents a member of the group consisting of a hydrogen atom, an alkyl group, a cycloalkyl group, and an aryl group and R and R' together represent a cycloalkyl group, the process being carried out at a condensation temperature in the presence of a catalyst comprising essentially a lead tetraalkyl which decomposes and forms free radicals at an elevated temperature, and recovering the resultant condensation product.

Another embodiment of this invention relates to a process for producing normal propyl benzene which comprises reacting ethylene and toluene at a condensation temperature in the presence of a catalyst comprising essentially a lead tetraalkyl and recovering normal propyl benzene from the resultant reaction product.

An additional embodiment of this invention relates to a process for producing normal propyl benzene which comprises reacting ethylene and toluene at a condensation temperature in the presence of a catalyst comprising essentially lead tetraethyl and recovering normal propyl benzene from the resultant reaction product.

An unsaturated organic compound suitable for use as a starting material in this process may be represented by the formula:

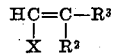

wherein each of $R^2$ and $R^3$ is selected from the group consisting of a hydrogen atom and a hydrocarbon group and X is selected from the group consisting of hydrogen and the substituents —CN,

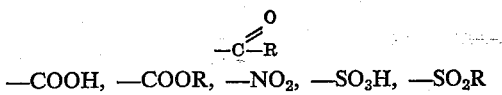

and

where R is hydrogen or hydrocarbon.

The unsaturated starting materials for this process thus include monoolefins such as ethylene, propylene, 1-butene, 2-butene, isobutylene, monoolefins of higher molecular weights, conjugated diolefins as butadiene and isoprene, non-conjugated dienes such as 2,5-dimethyl-1,5-hexadiene, non-conjugated polyolefins containing more than 2 pairs of double bonds per molecule, unsaturated ketones such as mesityl oxide and compounds such as allyl amine, allyl cyanide, acrylonitrile, and the like.

The compounds with which unsaturated organic compounds are condensed in our process comprise aromatic compounds having attached to a nuclear carbon atom a carbon atom of a saturated hydrocarbon group and to which last named carbon atom is attached at least one hydrogen atom. By the term aromatic compound we mean to include not only alkylated benzenes, substituted benzenes, naphthalene, and derivatives thereof, but also all compounds containing a stable ring or nucleus such as is present in benzene and which possess unsaturation in the sense that benzene does, but which have no ethylenic unsaturation. Consequently it can be seen that the term aromatic compound, in the sense in which it is used in the specification and the appended claims, includes not only carbocyclic compounds but also heterocyclic compounds having stable nuclei. The carbocyclic compounds may have a benzene, naphthalene, etc. nucleus. The heterocyclic aromatic compounds may have a pyridine, furan, thiophene, pyrrole, pyrazole, etc. nucleus. In addition, the aromatic compound contemplated for use in our process may contain both a carbocyclic ring and a heterocyclic ring such as is found in indole and in carbazole. Also, the aromatic compounds may contain both a benzene nucleus and a cycloalkane nucleus such as is found in tetrahydronaphthalene and in indan.

As hereinbefore stated, the aromatic compounds preferred for use in our process contain a saturated side chain, said chain being attached to a nuclear carbon atom by a saturated carbon atom, i. e., a carbon atom that is bonded by univalent bonds to four atoms. The saturated carbon atom should have at least one hydrogen atom attached thereto. These requisites are desirable for the reason that aromatic compounds such as t-butylbenzene, which have no hydrogen atom attached to the alpha carbon atom, show very little tendency under the conditions of operation employed in our process to undergo condensation of the type herein taught. Similarly, styrene, in which the alpha carbon atom in the side chain is unsaturated, does not condense with unsaturated organic compounds in the manner herein specified. Thus the preferred aromatic compounds are those in which the alpha carbon atom of the side chain is saturated and in which said alpha carbon atom has at least one hydrogen atom attached thereto. The side chain may comprise only one carbon atom, as the methyl group in toluene, or it may comprise a number of saturated carbon atoms in straight chain or branched chain relation such as the normal butyl radical or the isobutyl radical in normal butylbenzene and isobutylbenzene, respectively. The substituent need not necessarily be an aliphatic chain; it may be a cycloalkane radical as in tetrahydronaphthalene or as in cyclohexylbenzene or an aralkyl group as a benzyl group as in diphenylmethane.

Suitable alkylaromatic hydrocarbons include toluene, ethylbenzene, normal propylbenzene, cumene, normal and secondary butylbenzene, methylnaphthalene, and the like. Other suitable aromatic hydrocarbons include tetrahydronaphthalene, indan, diphenylmethane, cyclopentylbenzene, methylethylbenzene, etc.

The aromatic ring in the compounds herein referred to may contain other substituents such as a chloro group, a methoxy group, an ethoxy group, a nitro group, and the like.

The aromatic reactants employed in our process are condensed with unsaturated organic compounds; the unsaturated organic compounds are olefinic in character and include monoolefins and particularly ethylene. For the purposes of this invention, aromatic compounds such as benzene are not regarded as being unsaturated.

A catalyst which is useful in this process includes a lead tetraalkyl which decomposes and forms free radicals at an elevated temperature. Other radical producing substances such as various azo and diazo compounds are also used as catalysts in this process.

The lead tetraalkyls which are active catalysts for promoting side chain alkylation of alkylaromatic hydrocarbons with olefins and other unsaturated compounds are organic compounds of lead in which each of the 4 valences of lead is combined with an alkyl group. These alkyl groups include methyl, ethyl, propyl, isopropyl, butyl groups and other groups of longer carbon chain length. In a given lead tetraalkyl, all of the alkyl groups may be the same as for example in lead tetramethyl or in lead tetraethyl or the alkyl groups may be different such as in lead dimethyl-diethyl and other related lead tetraalkyls.

The various lead tetraalkyls are relatively unstable and decompose at relatively mild but elevated temperatures to form organic radicals such as methyl, ethyl, etc. radicals.

Better contacting of the reactants and catalysts and improved yields of desired products are sometimes effected by mixing the catalyst with a catalyst supporting or spacing material such as activated charcoal; also granular coke, silica, alumina, pumice, porcelain, quartz, steel turnings, copper shot, etc. which do not have an adverse influence on the reaction but improve the mixing. Such spacing materials are useful in either batch type operation as in an autoclave or in continuous treatment in a tubular reactor or other suitable apparatus.

This process which is useful in producing starting materials and intermediates suitable for the manufacture of detergents, resins, insecticides, etc. is illustrated by the following general equation:

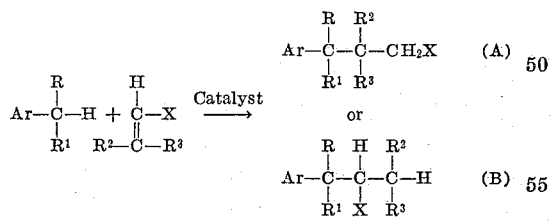

In the above indicated equation Ar represents an aromatic or heterocyclic radical such as phenyl, naphthyl, thienyl, furyl, etc., each of R, $R^1$, $R^2$, and $R^3$ is selected from the group consisting of a hydrogen atom and a hydrocarbon group and X is selected from the group consisting of —H, —CN,

—COOH, —COOR, —NO₂, —SO₃H, —SO₂R, and

In this process either compound A or B is produced depending on the substituents present in the reactants.

The following equations also serve to illustrate the process of this invention and the uses for the resultant products.

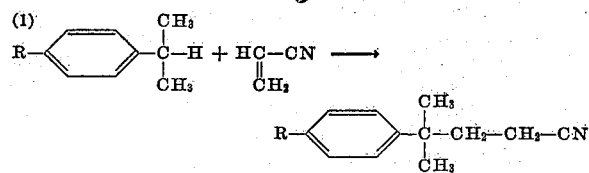

in which R represents an alkyl group such as a nonyl or dodecyl group.

The product formed by the process of Equation 1 can be hydrolyzed to the acid and converted into a detergent or wetting agent or to a heavy metal salt useful as a paint drier, a fungicide, or a lubricating oil additive.

Further applications of the process are also illustrated by the following Equations 2 and 3.

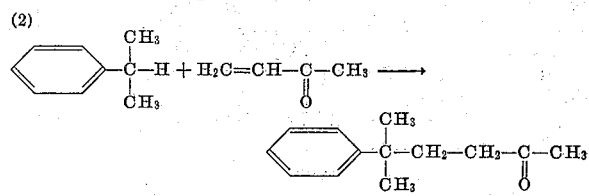

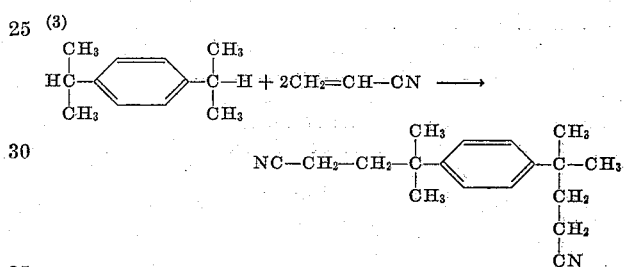

The dinitrile represented in foregoing Equation 3 may be used as an intermediate in the preparation of a polyamide resin, an alkyd resin, a polycarboxylic acid and a polyamine.

A condensation product of isopropylthiophene and a nitroolefin, 1-nitroethylene, may also be formed as indicated in Equation 4. The product has insecticidal properties.

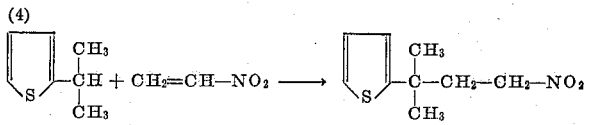

The condensation of an alkylaromatic hydrocarbon with an olefin hydrocarbon is represented by the following general equation:

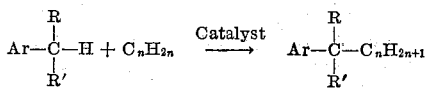

Thus the condensation of an alkylbenzene hydrocarbon such as normal butylbenzene or secondary butylbenzene with a long chain olefin such as propylene trimer yields a tridecylbenzene hydrocarbon which is useful as an intermediate for producing detergents and wetting agents. For this purpose the tridecylbenzene is sulfonated with strong sulfuric acid to form the sulfonic acid which is then metallized with a base such as sodium hydroxide, sodium carbonate, and the like to form the sodium salt of a long chain alkylbenzene sulfonic acid.

The process of this invention is carried out using either batch or continuous types of operation in suitable equipment such as an autoclave or tubular reactor constructed from steel or glass lined steel reactors. The process is carried out at a temperature of from about 50° to about 400° C. and preferably at a temperature of from about 150° to about 275° C. at a pressure of from about atmospheric to about 200 atmospheres. When the stirring or mixing of the reactants and catalyst is very thorough and efficient, the process may be carried out at a temperature of 125° C. and at a pressure of 5 atmospheres but higher temperatures and pressures are preferred when the mixing is less efficient. The operating temperature and pressure will also be dependent upon the aromatic and olefinic compounds charged and upon the ratios of reactants present in the reaction zone, as well as upon the catalyst present.

In order to promote the primary side chain alkylation, that is, to attach only one alkyl group to the alkyl side chain and in some instances to decrease the loss of olefin through undesired side reactions, it is generally preferred to employ an excess of aromatic hydrocarbon to olefin such as ethylene in this process. In other words, the preferred ratio of aromatic hydrocarbon to olefinic hydrocarbon is greater than one.

The amount of catalyst used in the process is dependent upon the nature and reactivity of the aromatic compound undergoing side chain alkylation and upon the nature of the olefin used as alkylating agent. In general, from about 0.1 to about 5 mol percent of the free radical producing substance is needed based upon the alkylaromatic hydrocarbon or other side chain alkylatable compounds present in the reaction zone.

In carrying out the process the olefinic hydrocarbon charged such as ethylene may be introduced continuously or intermittently, the latter method being commonly employed in the usual type of batch operation conducted in an autoclave so that the consumption of ethylene can be followed by observing the decrease in operating pressure of the autoclave as the reaction progresses. After the reaction has reached the desired stage of completion, the reaction products are discharged from the autoclave, unconverted olefin such as ethylene is recovered for further use in the process or utilized for some other purpose. The mixture of reaction products is then subjected to suitable separation treatment such as fractional distillation of normally liquid products to separate unconverted charging stock from side chain alkylated products and higher boiling materials, the latter being sometimes formed as by-products of the reaction.

In this process one molecular proportion of olefin such as ethylene and one molecular proportion of alkylaromatic hydrocarbon as toluene react in the presence of a lead tetraalkyl to form a longer chain alkaromatic hydrocarbon as illustrated by the following equation:

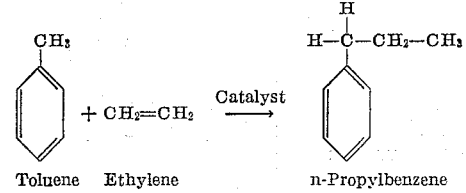

Toluene   Ethylene                n-Propylbenzene

The resultant reaction product such as n-propylbenzene may sometimes react with a further molecular proportion of olefin as ethylene to form a still longer chain alkylaromatic hydrocarbon as indicated in the following equation:

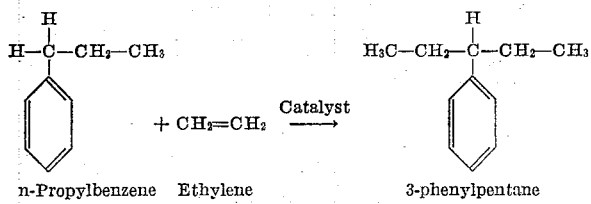

n-Propylbenzene   Ethylene            3-phenylpentane

Other alkylaromatic hydrocarbons and cycloalkylaromatic hydrocarbons may be reacted similarly with ethylene to produce longer chain alkylaromatic hydrocarbons from one molecular proportion of the charged alkylaromatic hydrocarbon and one, two or more molecular proportions of the olefin.

The nature of this invention in illustrated further by the following examples which however should not be misconstrued to limit unduly the generally broad scope of the invention.

Example I

A glass lined rotatable steel autoclave of 850 cc. capacity was charged with 92 grams (1 mol) of toluene and 10.2 grams of lead tetraethyl, the autoclave was then closed and ethylene was admitted thereto through a control valve to a pressure of 30 atmospheres. The autoclave so charged with toluene, lead tetraethyl and ethylene was then heated at a temperature of 250° C. for a time of 3 hours. After the autoclave had cooled to room temperature part of the reaction product was removed therefrom and subjected to fractional distillation. The reaction product contained six grams of propylbenzene, five grams of amylbenzene, and some higher boiling alkylbenzenes.

Example II

The autoclave employed in Example I was charged similarly with 92 grams of toluene, 10 grams of lead tetraethyl and 31.6 grams of propylene. The charged autoclave was then heated at a temperature of 250° C. for a time of 3 hours. The resultant reaction product contained 4 grams of n-butylbenzene together with higher boiling aromatic hydrocarbons.

We claim as our invention:

1. A process for the side chain alkylation of an alkylbenzene in which at least one hydrogen atom is directly attached to the alpha carbon group, which comprises reacting said alkylbenzene with an alkene at condensation conditions including a temperature of from about 50° to about 400° C. and a pressure of from about atmospheric to about 200 atmospheres in the presence of a lead tetraalkyl catalyst which forms free radicals at said conditions.

2. A process for producing longer chain aromatic hydrocarbons which comprises reacting an alkene with the side chain of an aromatic hydrocarbon having directly attached to a nuclear carbon atom a carbon atom of a saturated hydrocarbon group to which last-named carbon atom is attached at least one hydrogen atom at a condensation temperature of from about 50° to about 400° C. and at a condensation pressure of from about atmospheric to about 200 atmospheres in the presence of a catalyst comprising essentially a lead tetraalkyl which forms free radicals at said temperature and recovering the resultant condensation product.

3. A process for producing a longer chain benzene hydrocarbon which comprises reacting an alkene with the side chain of a benzene hydrocarbon having directly attached to a nuclear carbon atom a carbon atom of a saturated hydrocarbon group and to which last-named carbon atom is attached at least one hydrogen atom at a condensation temperature of from about 50° to about 400° C. and at a condensation pressure of from about atmospheric to about 200 atmospheres in the presence of a catalyst comprising essentially a lead tetraalkyl which forms free radicals at said temperature, and recovering the resultant condensation product.

4. A process for producing a longer chain benzene hydrocarbon which comprises reacting ethylene with the side chain of a benzene hydrocarbon having directly attached to a nuclear carbon atom a carbon atom of a saturated hydrocarbon group and to which last-named carbon atom is attached at least one hydrogen atom at a condensation temperature of from about 50° to about 400° C. and at a condensation pressure of from about atmospheric to about 200 atmospheres in the presence of a catalyst comprising essentially a lead tetraalkyl which forms free radicals at said temperature, and recovering the longer chain benzene hydrocarbon from the resultant reaction product.

5. A process for producing a longer chain benzene hydrocarbon which comprises reacting ethylene and a benzene hydrocarbon having directly attached to a nuclear carbon atom a carbon atom of a saturated hydrocarbon group and to which last-named carbon atom is attached at least one hydrogen atom at a condensation temperature of from about 50° to about 400° C. and at a condensation pressure of from about atmospheric to about 200 atmospheres in the presence of a catalyst comprising essentially lead tetraalkyl and recovering a longer chain benzene hydrocarbon from the resultant reaction product.

6. A process for producing normal propyl benzene which comprises reacting ethylene and toluene at a condensation temperature of from about 50° to about 400° C. and at a condensation pressure of from about atmospheric to about 200 atmospheres in the presence of a catalyst comprising essentially lead tetraalkyl, and recovering normal propyl benzene from the resultant reaction product.

7. A process for producing normal propyl benzene which comprises reacting ethylene and toluene at a condensation temperature of from about 50° to about 400° C. and at a condensation pressure of from about atmospheric to about 200 atmospheres in the presence of a catalyst comprising essentially lead tetraethyl, and recovering normal propyl benzene from the resultant reaction product.

8. A process for producing longer chain substituted aromatic hydrocarbons which comprises reacting an alkene with the side chain of an aromatic hydrocarbon having directly attached to a nuclear carbon atom a carbon atom of a saturated hydrocarbon group and to which last-named carbon atom is attached at least one hydrogen atom at a temperature of from about 50° to about 400° C. and at a pressure of from about atmospheric to about 200 atmospheres in the presence of a catalyst comprising essentially a lead tetraalkyl which forms free radicals at said temperatures, and recovering the resultant condensation product.

9. A process for producing a longer chain substituted benzene hydrocarbon which comprises reacting ethylene with the side chain of a benzene hydrocarbon having directly attached to a nuclear carbon atom a carbon atom of a saturated hydrocarbon group and to which last-named carbon atom is attached at least one hydrogen atom at a temperature of from about 50° to about 400° C. and at a pressure of from about atmospheric to about 200 atmospheres in the presence of a catalyst comprising essentially a lead tetraalkyl which forms free radicals at said temperatures, and recovering a longer chain benzene hydrocarbon from the resultant reaction product.

10. A process for producing normal propyl benzene which comprises reacting ethylene and toluene at a temperature of from about 50° to about 400° C. and at a pressure of from about atmospheric to about 200 atmospheres in the presence of a catalyst comprising essentially lead tetraethyl, and recovering normal propyl benzene from the resultant reaction product.

11. A process for producing normal propyl benzene which comprises reacting ethylene and toluene at a temperature of from about 50° to about 400° C. and at a pressure of from about atmospheric to about 200 atmospheres in the presence of a catalyst comprising essentially lead tetraethyl, and recovering normal propyl benzene from the resultant reaction product.

12. A process which comprises reacting ethylene with the side chain of an aromatic hydrocarbon having directly attached to a nuclear carbon atom a carbon atom of a saturated hydrocarbon group to which last-named carbon atom is attached at least one hydrogen atom at condensation conditions including a temperature of from about 50° to about 400° C. and a pressure of from about atmospheric to about 200 atmospheres in the presence of a lead tetraalkyl catalyst which forms free radicals at said conditions and recovering the resultant condensation product.

13. A process which comprises reacting ethylene with the side chain of an aromatic hydrocarbon having directly attached to a nuclear carbon atom a carbon atom of a saturated hydrocarbon group to which last-named carbon atom is attached at least one hydrogen atom at condensation conditions including a temperature of from about 50° to about 400° C. and a pressure of from about atmospheric to about 200 atmospheres in the presence of a lead tetraethyl catalyst which forms free radicals at said conditions and recovering the resultant condensation product.

References Cited in the file of this patent

UNITED STATES PATENTS

| | | |
|---|---|---|
| 2,402,137 | Hanford et al. | June 18, 1946 |
| 2,450,099 | Thompson | Sept. 28, 1948 |
| 2,552,980 | Ladd et al. | May 15, 1951 |
| 2,660,610 | Erchak | Nov. 24, 1953 |
| 2,728,802 | Closson et al. | Dec. 27, 1955 |

FOREIGN PATENTS

| | | |
|---|---|---|
| 60,768 | Netherlands | Mar. 15, 1948 |